US012770082B2

(12) United States Patent
Denis et al.

(10) Patent No.: US 12,770,082 B2
(45) Date of Patent: Oct. 20, 2026

(54) ARTIFICIAL INTELLIGENCE (AI) ARBITRAGE VIA TETRATION-DRIVEN PROCESS AUTOMATION AND OPTIMIZATION

(71) Applicant: Seer Global, Inc., New York, NY (US)

(72) Inventors: Andrew Denis, Prescott, AZ (US); Harry Howard Wills, Jr., Princeville, HI (US)

( * ) Notice: Subject to any disclaimer, the term of this patent is extended or adjusted under 35 U.S.C. 154(b) by 0 days.

(21) Appl. No.: 19/039,428

(22) Filed: Jan. 28, 2025

(65) Prior Publication Data

US 2026/0220576 A1 Jul. 30, 2026

(51) Int. Cl.
*G06Q 10/0633* (2023.01)
*G06N 20/00* (2019.01)

(52) U.S. Cl.
CPC ......... *G06Q 10/0633* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,698,239 | B2 | 4/2010 | Lieuallen et al. | |
| 8,407,081 | B1 | 3/2013 | Rajasenan | |
| 11,100,373 | B1 | 8/2021 | Crosby et al. | |
| 11,184,234 | B2 | 11/2021 | Mahdi et al. | |
| 12,197,859 | B1 * | 1/2025 | Malviya | G06F 40/216 |
| 2019/0121343 | A1 * | 4/2019 | Cella | G05B 19/4185 |
| 2025/0124256 | A1 * | 4/2025 | Agarwal | G06N 3/044 |
| 2025/0259075 | A1 * | 8/2025 | Crabtree | G06F 16/3344 |
| 2026/0057039 | A1 * | 2/2026 | Woods | G06F 18/2178 |

* cited by examiner

*Primary Examiner* — Chesiree A Walton
(74) *Attorney, Agent, or Firm* — Jones Intellectual Property

(57) ABSTRACT

A system and method for value enhancement and expansion that transcends traditional compound growth models by leveraging the ability of artificial intelligence (AI) to drive stacked exponential growth through self-improving optimization cycles. Each area of AI enhancement not only generates immediate value, but also enhances the ability of the system to create even more value in future implementations via the rapidly evolving AI capabilities.

17 Claims, 12 Drawing Sheets

ARTIFICIAL INTELLIGENCE (AI) ARBITRAGE VIA TETRATION-DRIVEN PROCESS AUTOMATION AND OPTIMIZATION

BACKGROUND OF THE INVENTION

1. Field of the Invention

The present invention relates generally to artificial intelligence (AI) systems and methods for process optimization, and more particularly to systems and methods for achieving stacked exponential (tetration) valuation differentials through self-improving AI optimization cycles that leverage AI-enabled reasoning for process automation and optimization.

2. Description of the Prior Art

It is generally known in the prior art to provide for the use of artificial intelligence systems to improve processes.

Prior art patent documents include the following:

U.S. Pat. No. 11,100,373 for Autonomous and continuously self-improving learning system by inventors Crosby et al., filed Nov. 2, 2020 and issued Aug. 24, 2021, discloses a system and methods in which an artificial intelligence inference module identifies targeted information in large-scale unlabeled data, wherein the artificial intelligence inference module autonomously learns hierarchical representations from large-scale unlabeled data and continually self-improves from self-labeled data points using a teacher model trained to detect known targets from combined inputs of a small hand labeled curated dataset prepared by a domain expert together with self-generated intermediate and global context features derived from the unlabeled dataset by unsupervised and self-supervised processes. The trained teacher model processes further unlabeled data to self-generate new weakly-supervised training samples that are self-refined and self-corrected, without human supervision, and then used as inputs to a noisy student model trained in a semi-supervised learning process on a combination of the teacher model training set and new weakly-supervised training samples. With each iteration, the noisy student model continually self-optimizes its learned parameters against a set of configurable validation criteria such that the learned parameters of the noisy student surpass and replace the learned parameter of the prior iteration teacher model, with these optimized learned parameters periodically used to update the artificial intelligence inference module.

U.S. Pat. No. 7,698,239 for Self-evolving distributed system performance using a system health index by inventors Lieuallen et al., filed Apr. 28, 2006 and issued Apr. 13, 2010, discloses an artificial intelligence system configuring the network variables. A metric describing the overall system performance may be derived during network operation or simulation and compared to an ideal metric describing the same distributed system performance. The difference between the derived metric and the ideal metric may then be used with an artificial intelligence system to modify the network variables to evolve the system toward the ideal performance standard.

U.S. Pat. No. 11,184,234 for Self-optimizing fabric architecture and self-assembling network by inventors Mahdi et al., filed Apr. 15, 2020 and issued Nov. 23, 2021, discloses a controller associated with a domain including a network interface; one or more processors communicatively coupled to the network interface; and memory storing instructions that, when executed, cause the one or more processors to communicate with one or more additional controllers via the network interface, wherein each of the one or more additional controllers is in one or more additional domains, and wherein each domain provides different characteristics, utilize at least part of a control pattern to obtain requirements for a service, and cause, utilizing any of a peer relationship and a hierarchical relationship with the one or more additional controllers, at least part of implementation of a composition of resources to meet the requirements for the service, wherein the composition defines the resources provided in each domain for the service, and wherein the composition is based on the requirements and the different characteristics in each domain.

U.S. Pat. No. 8,407,081 for Method and system for improving efficiency in an organization using process mining by inventor Rajasenan, filed Nov. 28, 2011 and issued Mar. 26, 2013, discloses systems and methods for improving processes in a healthcare organization by mining historical data for information that can be used to more effectively allocate resources and process components. Factors used for the analysis include time, information, motivation, skills, and authority for particular resources. Arbitrage processing is used to minimize opportunity costs and increase efficiency.

SUMMARY OF THE INVENTION

The present invention relates generally to artificial intelligence (AI) systems and methods for process optimization, and more particularly to systems and methods for achieving stacked exponential (tetration) valuation differentials through self-improving, AI optimization cycles that leverage AI-enabled reasoning for process automation and optimization. Further, the present invention defines a novel type of AI-driven arbitrage generation.

It is an object of this invention to drive stacked exponential growth through self-improving optimization cycles to enable value enhancement and expansion that transcends traditional compound growth models.

In one embodiment, the present invention is directed to a method for achieving tetration growth in process optimization using artificial intelligence (AI), including an AI module receiving data inputs, a directive, and at least one boundary for generating at least one output, wherein the AI module includes an architecture for analyzing the data inputs and the directive and providing the at least one output, the AI module implementing self-supervised learning and synthetic data generation to improve the generation of the at least one output for multiple dimensions, and modifying the architecture for analyzing the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension, and the AI module providing the at least one output, wherein the at least one output provides at least one recommended action to improve the at least one technical dimension including a recommended action to improve the output of the AI module and/or a recommended modification to a step of the process, at least one recommended action to improve the at least one financial dimension including a recommended action to reduce at least one cost for the process and/or a recommended action to increase a revenue gain for the process, and at least one recommended action to improve the at least one operational dimension including a recommended action to improve an efficiency of the process, a recommended action to integrate the process with at least one second process, and/or a recommended action to include additional data from an additional data source in the data inputs, wherein the AI module is hosted by at least one server computer including a processor and a memory, wherein the architecture includes parameters for utilization of the at least one output by the AI module for a subsequent output, and wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output.

In another embodiment, the present invention is directed to a system for achieving tetration growth in process optimization using artificial intelligence (AI), including an AI module configured to receive data inputs, a directive, and at least one boundary for generating at least one output, at least one server computer, including a processor and a memory, configured to host the AI module, wherein the AI module includes an architecture for analyzing the data inputs and the directive and providing the at least one output, wherein the AI module implements self-supervised learning and synthetic data generation to improve the generation of the at least one output for multiple dimensions, wherein the architecture is modified to analyze the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension, wherein the AI module provides the at least one output, wherein the at least one output provides at least one recommended action to improve the at least one technical dimension including a recommended action to improve the output of the AI module and/or a recommended modification to a step of the process, at least one recommended action to improve the at least one financial dimension including a recommended action to reduce at least one cost for the process and/or a recommended action to increase a revenue gain for the process, and at least one recommended action to improve the at least one operational dimension including a recommended action to improve an efficiency of the process, a recommended action to integrate the process with at least one second process, and/or a recommended action to include additional data from an additional data source in the data inputs, wherein the architecture includes parameters for utilization of the at least one output by the AI module for a subsequent output, and wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output.

In yet another embodiment, the present invention is directed to a method for achieving tetration growth in process optimization using artificial intelligence (AI), including an AI module receiving data inputs, a directive, and at least one boundary for generating at least one output, wherein the AI module includes an architecture for analyzing the data inputs and the directive and providing the at least one output, the AI module implementing self-supervised learning and synthetic data generation to improve the generation of the at least one output for multiple dimensions, and modifying the architecture for analyzing the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension, and the AI module providing the at least one output, wherein the at least one output provides at least one recommended action to improve the at least one technical dimension including a recommended action to improve the output of the AI module and/or a recommended modification to a step of the process, at least one recommended action to improve the at least one financial dimension including a recommended action to reduce at least one cost for the process and/or a recommended action to increase a revenue gain for the process, and at least one recommended action to improve the at least one operational dimension including a recommended action to improve an efficiency of the process, a recommended action to integrate the process with at least one second process, and/or a recommended action to include additional data from an additional data source in the data inputs, wherein the AI module is hosted by at least one server computer including a processor and a memory, wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output, and wherein the unstructured data inputs include one or more mind maps, one or more digital images, and/or supporting descriptions for mind maps and/or digital images.

These and other aspects of the present invention will become apparent to those skilled in the art after a reading of the following description of the preferred embodiment when considered with the drawings, as they support the claimed invention.

DETAILED DESCRIPTION

Figure 1:
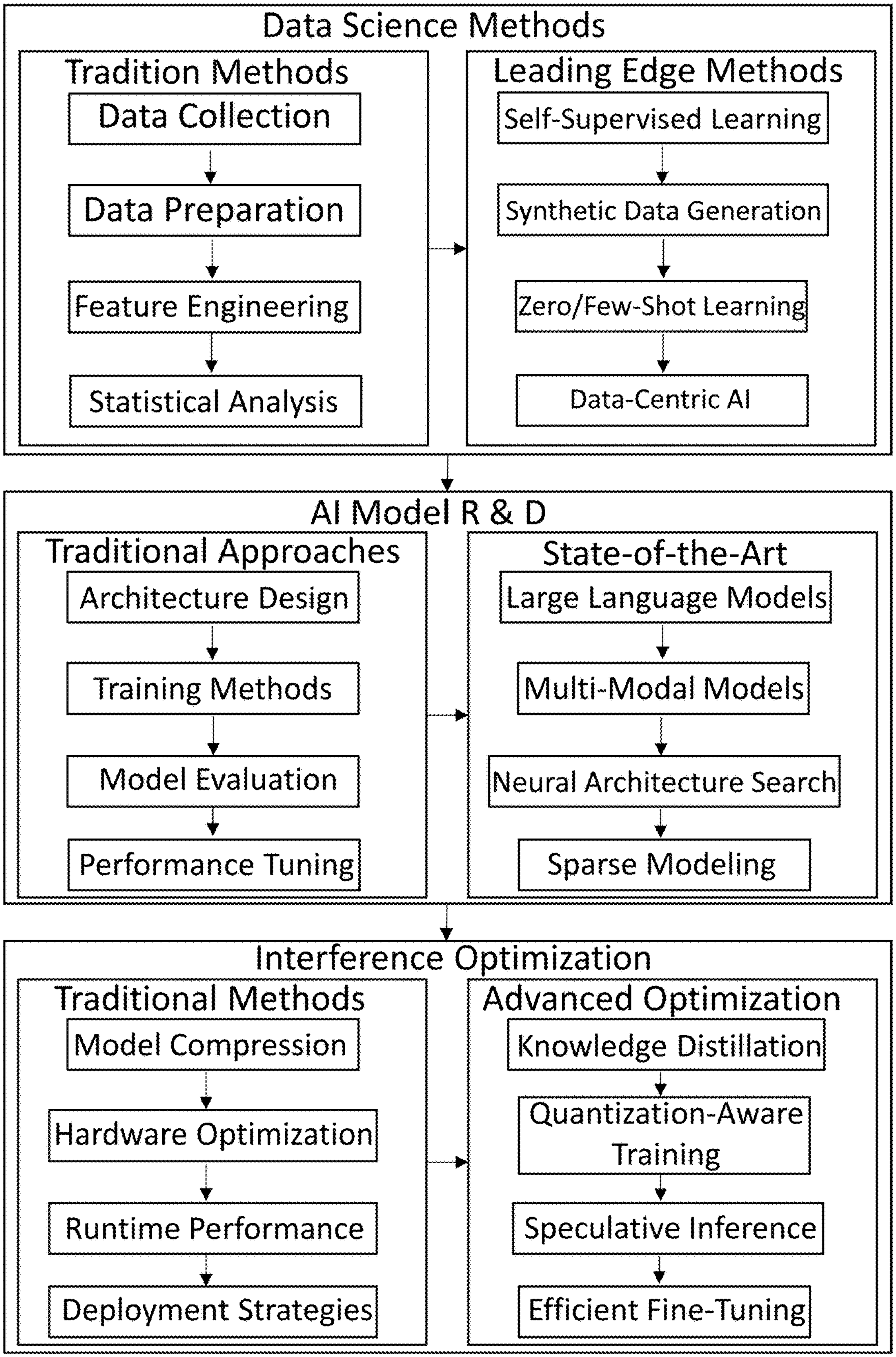
FIG. 1 is a schematic diagram showing fundamental components for an artificial intelligence (AI) system according to one embodiment of the present invention.

The present invention is generally directed to artificial intelligence systems and methods for process optimization, and more particularly to systems and methods for achieving stacked exponential (tetration) valuation differentials through self-improving, AI optimization cycles that leverage AI-enabled reasoning for process automation and optimization. Further, the present invention defines a novel type of AI-driven arbitrage generation.

In one embodiment, the present invention is directed to a method for achieving tetration growth in process optimization using artificial intelligence (AI), including an AI module receiving data inputs, a directive, and at least one boundary for generating at least one output, wherein the AI module includes an architecture for analyzing the data inputs and the directive and providing the at least one output, the AI module implementing self-supervised learning and synthetic data generation to improve the generation of the at least one output for multiple dimensions, and modifying the architecture for analyzing the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension, and the AI module providing the at least one output, wherein the at least one output provides at least one recommended action to improve the at least one technical dimension including a recommended action to improve the output of the AI module and/or a recommended modification to a step of the process, at least one recommended action to improve the at least one financial dimension including a recommended action to reduce at least one cost for the process and/or a recommended action to increase a revenue gain for the process, and at least one recommended action to improve the at least one operational dimension including a recommended action to improve an efficiency of the process, a recommended action to integrate the process with at least one second process, and/or a recommended action to include additional data from an additional data source in the data inputs, wherein the AI module is hosted by at least one server computer including a processor and a memory, wherein the architecture includes parameters for utilization of the at least one output by the AI module for a subsequent output, and wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output.

In another embodiment, the present invention is directed to a system for achieving tetration growth in process optimization using artificial intelligence (AI), including an AI module configured to receive data inputs, a directive, and at least one boundary for generating at least one output, at least one server computer, including a processor and a memory, configured to host the AI module, wherein the AI module includes an architecture for analyzing the data inputs and the directive and providing the at least one output, wherein the AI module implements self-supervised learning and synthetic data generation to improve the generation of the at least one output for multiple dimensions, wherein the architecture is modified to analyze the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension, wherein the AI module provides the at least one output, wherein the at least one output provides at least one recommended action to improve the at least one technical dimension including a recommended action to improve the output of the AI module and/or a recommended modification to a step of the process, at least one recommended action to improve the at least one financial dimension including a recommended action to reduce at least one cost for the process and/or a recommended action to increase a revenue gain for the process, and at least one recommended action to improve the at least one operational dimension including a recommended action to improve an efficiency of the process, a recommended action to integrate the process with at least one second process, and/or a recommended action to include additional data from an additional data source in the data inputs, wherein the architecture includes parameters for utilization of the at least one output by the AI module for a subsequent output, and wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output.

In yet another embodiment, the present invention is directed to a method for achieving tetration growth in process optimization using artificial intelligence (AI), including an AI module receiving data inputs, a directive, and at least one boundary for generating at least one output, wherein the AI module includes an architecture for analyzing the data inputs and the directive and providing the at least one output, the AI module implementing self-supervised learning and synthetic data generation to improve the generation of the at least one output for multiple dimensions, and modifying the architecture for analyzing the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension, and the AI module providing the at least one output, wherein the at least one output provides at least one recommended action to improve the at least one technical dimension including a recommended action to improve the output of the AI module and/or a recommended modification to a step of the process, at least one recommended action to improve the at least one financial dimension including a recommended action to reduce at least one cost for the process and/or a recommended action to increase a revenue gain for the process, and at least one recommended action to improve the at least one operational dimension including a recommended action to improve an efficiency of the process, a recommended action to integrate the process with at least one second process, and/or a recommended action to include additional data from an additional data source in the data inputs, wherein the AI module is hosted by at least one server computer including a processor and a memory, wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output, and wherein the unstructured data inputs include one or more mind maps, one or more digital images, and/or supporting descriptions for mind maps and/or digital images Traditional business process optimization typically achieves linear, or at best some degree of temporary exponential growth, through conventional implementation of improvements, whether via human efforts, or via computer assisted/automated methods. Current artificial intelligence (AI) systems, while capable of providing advantages over manual efforts in various contexts, fail to achieve any degree of ongoing stacked exponential growth effects across multiple concurrent dimensions, such as operational, time, cost, growth, and other factors.

Further, traditional machine learning and other computer automation has efficiency gains that are highly fixed in time and scope, meaning that they do not natively evolve based on AI's stacked exponential ('hyper-exponential") growth rates. As such, the value that they provide is generally reflected as what is sometimes referred to as a "stair-step" functional increase in efficiency and value, rather than one able to continually evolve along a stacked, hyper-exponential curve based on continual AI refinement and optimization methods as described herein.

This is, in part, because existing solutions lack the capability to create self-reinforcing intelligently automated cycles of improvement that operate across multiple financial and operational dimensions. Furthermore, current approaches do not effectively capture and leverage the meta-learning potential required to support AI-scaling levels of real-world business processes. These are some of the key differences and advantages obtained via the process and supporting technology driven approach of the present invention.

The present invention defines the systems and methods for achieving tetration scaling growth in business process optimization through uniquely designed and implemented AI-enabled capabilities, which are then applied to functional, operational and related valuation metrics to support AI-enabled arbitrage as described in detail below.

FIG. 1 is a schematic diagram showing fundamental components for an artificial intelligence (AI) system according to one embodiment of the present invention. The invention leverages three existing foundational component areas as part of its foundation: (1) Data Science capture and pipelining methods, including both traditional and leading-edge approaches as described and depicted in FIG. 1; (2) AI Model architecture optimization capabilities and processes as defined herein; and (3) Inference Mode Based Optimization, with particular emphasis on post-training optimization techniques as described herein. These foundational component areas provide a basis or foundation that the methodology of the present invention builds upon in several unique ways. Further, beyond that technological basis, the present invention integrates critical business process automation and optimization methodologies as described herein. The resulting capabilities enable entirely new sources and modes of operational and financial value that are not currently possible via existing methods.

In one embodiment, the invention includes a method for creating self-reinforcing cycles of improvement across multiple dimensions including technical, operational, and financial domains. The method includes steps for implementing AI systems that are structured to support continuous improvement of their own optimization algorithms while simultaneously discovering new optimization opportunities. In another embodiment, the invention provides a system for AI capability arbitrage that exploits value differentials created by the implementation of uniquely architected AI systems in previously non-AI environments.

Figure 4:
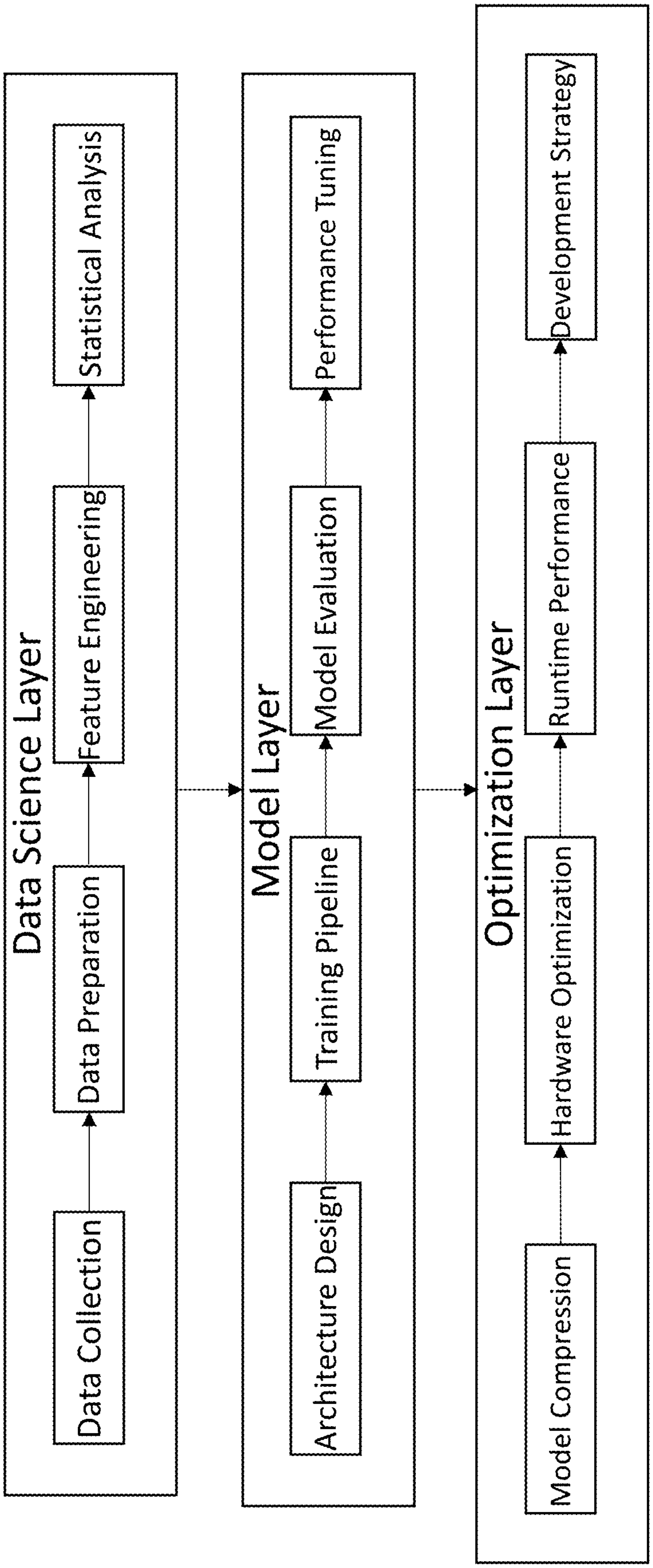
FIG. 4 is a schematic diagram of a high level system architecture according to one embodiment of the present invention.

Key to the method of the present invention is the unique architecture and approach that provides the ability to leverage leading-edge data science, AI model architectures and inference optimizations, which are just becoming available as of early 2025. This invention makes use of the current state of the art methods to support the business process capabilities enabling the arbitrage capabilities as defined herein. The reason for this is as follows, and as depicted in FIG. 4, discussed below.

Prior to the current self-supervised learning across limited input examples (few-shot and zero-shot learning) to support synthetic data sourcing, business process algorithms and adapted learning methods would have to be defined by AI developers, data scientists and others. The need to employ human efforts negates the ability of prior art systems to support the automated (i) Foundational Layer, (ii) Operational Skills Layer, and (iii) Strategic Understanding skills derivation via synthetic data and process derivation, which are achieved with the present invention. In one embodiment, few-shot learning means the use of 2-5 examples per class.

Prior to the current state of multimodal large language models and the intelligently integrated sparse search modes supported via deep learning methods, the training and related R&D required manual (human) intervention, since agentic tree of thought and subsequent process automation as defined herein were not yet viable.

Prior to the efficient inference driven data distillation and the architectures that enabled it, extensive sets of data created to define and optimize the processes defined below in an AI automated manner would not be possible. Simply stated, this automated data distillation via largely synthetic data generation provides the final major foundational component necessary for the unique deep learning enabled process described in the present invention.

By building upon this as described below, the present invention is able to create a general-purpose business process automation and optimization-derived arbitrage system or "engine" that uses a novel set of processes to automate and continually refine such processes. As a result, the growth rates of value, efficiency and resulting operational and related outcomes are able to substantially mirror the inherent stacked exponential growth rate of AI, which is leveraged by the present invention.

In order to understand the value and improvement of the present invention, context of the history of artificial intelligence is critical to review. In the early history of programming and in systems still implemented today, software development was written line-by-line in low-level or high-level languages (e.g., PYTHON, FORTRAN, C, etc.) and developers explicitly specified each step while defining and implementing all the algorithms and data structures needed for a program to function. This period allowed for fine-grained control over the behavior of the code, leading to very predictable execution flows. However, this system is extremely time-consuming to develop and maintain, with every function, element and workflow needing to be carefully created, debugged, and maintained. These systems do not automatically learn from data, as domain knowledge needs to be manually embedded by human programmers.

The earliest, most basic form of AI to emerge is able to be called "expert systems" and are essentially rules-based AI or rules-based automation systems (e.g., MYCIN, DENDRAL, etc.). These systems essentially include a series of IF-THEN statements derived from domain experts to chain rules to arrive at conclusions. These systems are useful, as they allow the system to capture specialist knowledge, and, for some limited use cases, are able to outperform human actors. However, these systems lack flexibility, as the rules need to be updated manually, quickly becoming unmanageable as domains grow in complexity. The systems rely heavily on extensive human effort to make the original rules and incorporation of new data requires manual analysis and coding in order to update the model, with the models generally poorly generalizing beyond a predefined knowledge base.

Classical machine learning (ML) models represent a step up in sophistication beyond expert systems, shifting the focus of such systems from writing explicit rules to learning patterns directly informed from labeled datasets. These systems utilize algorithms such as linear regression, support vector machines (SVMs), decision trees, and neural network-learned functions that map inputs to outputs. Deep learning models are specific variations on these machine learning models, including the use of convolutional neural networks (CNNs) for computer vision, recurrent neural networks (RNNs) for sequence data, and other tasks that make use of larger datasets (e.g., ImageNet, large text corpora, etc.) and increased computing power (enabled by graphics processing units, or GPUs) to drive breakthroughs. These models are advantageous as they are able to generalize to unforeseen use cases without explicit, manual rule creation and often outperform other models for tasks such as image recognition, speech recognition, and language modeling. However, these systems are reliant on large, human-labeled datasets, and largely learn via supervised learning models requiring labor-intensive data duration and annotation. These models often struggle with unstructured data that lacks clear labels or a reference "ground truth," or they modify or destroy knowledge embedded in the original ground truth data by reorganizing, structuring, and labeling the data.

State of the art AI models, as of early 2025, which are able to be implemented in the present invention, include self-supervised foundation models, such as large language models (LLMs) or large concept models (LCMs) that are trained on very large, and increasingly unlabeled, text corpora (e.g., transformers). Self-supervision is accomplished by predicting missing words or tokens, removing much of the need for manually labeled data at scale. These advanced models are often able to adapt to new tasks with minimal examples or prompts, and are able to handle unstructured data (e.g., text, images, sound, video, code, etc.) and generate coherent outputs across domains. Some cutting-edge approaches allow these models to reason through multiple steps explicitly (i.e., "thinking out loud") or explore branching solution paths (i.e., a tree-of-thought), improving the ability of the model to handle complex problem-solving and reducing reliance on direct, large-scale supervision. These models are able to generate synthetic data (e.g., text, images, etc.) to augment or replace manually curated datasets, and implement reinforcement learning with human feedback (RLHF), reinforcement learning with AI feedback (RLAIF), or other optimization loops that refine performance in a targeted, iterative manner. These cutting-edge models require much less labeling or curation due to the self-supervised training and synthetic data and are able to iterate on ideas, reason more autonomously, an adapt to new tasks quickly, bypassing traditional software development cycles and time-consuming, cost-intensive human data science efforts. These benefits dramatically reduce engineering workload compared to less sophisticated systems and provide the basis for the new approaches and technology described in the present invention.

The general history of AI is therefore one that substitutes data-driven agentic reasoning for manual coding or curation. A first trend is the movement from explicit code to learned patterns, allowing contemporary systems to infer and generalize solutions from examples or self-supervised tasks, rather than requiring every instruction be individually, manually coded. A second trend is to reduce dataset size requirements as previously supervised ML models required large, labeled datasets, whereas few-shot/one-shot models and generative AI rely more heavily on smaller foundation models and prompt sets, or even are capable of functioning without labeled data at all. With this change comes a movement from structured data (e.g., tables, spreadsheets, etc.) to raw text, images, and sound, with models also capable of creating synthetic samples to reduce reliance on human annotation. Finally, contemporary models substitute agentic reasoning, supported by sophisticated architecture and inference strategies, to allow for deeper, more autonomous problem-solving. This paves the way for AI agents to handle complex workflows with minimal human oversight.

Contemporary AI systems provide a foundation for the present invention to fundamentally rearchitect an approach to problem solving and process engineering and the use of technology to support process automation and optimization. However, while state-of-the-art AI technology provides a foundation, the present invention requires new agent-defined processes and data technology-driven methods to leverage those foundational capabilities. Additionally, in one embodiment, the present invention is implemented using photonic or quantum AI architectures.

No matter how advanced an AI model is, the model must operate within a specific purpose or to meet a set of objectives (e.g., "optimize supply chain routes," "draft a contract," etc.). These objectives for the front-end goal channel the reasoning capabilities of the AI toward beneficial outcomes and prevent the AI from wandering into irrelevant or harmful decisions. Constraints and directives (e.g., regulatory requirements, ethical frameworks, domain-specific guidelines, etc.), on the other hand, ensure that the output of the AI aligns with organizational and societal values. By bounding the decision space of the AI, the system guards against unintended consequences and maintains the trustworthiness of the system.

Even if an AI is able to autonomously generate solutions, it must typically integrate with larger workflows (e.g., data pipelines, application programming interfaces (APIs), user interfaces, etc.). The process architecture of the system defines how the insights from the AI feed into or trigger subsequent tasks, ensuring the entire end-to-end process is orchestrated safely and efficiently. While modern self-supervised and few-shot approaches are able to operate on much smaller labeled datasets, this does not mean the AI is able to operate without guidance, as front-end prompt engineering, domain specification, and environmental constraints still direct the reasoning of the AI. Where an AI is able to act as an agent (i.e., autonomously iterating on ideas and exploring solution paths), the AI still needs a high-level directive (e.g., "find the most cost-effective route," "draft a summary and highlight key risks," etc.) and guardrails to ensure it does not stray from valid or ethical behavior. The agentic capability of the AI is enhanced by advanced methods (e.g., self-supervision, chain-of-thought reasoning, synthetic data augmentation, etc.) but those methods still rely on front-end constraints to remain targeted and safe.

The ability of models to "think out loud" (i.e., chain-of-thought) and to explore multiple solution paths through trees-of-thought has meant that fewer labeled examples are required. This shift puts higher-level domain goals at the forefront, rather than requiring meticulously hand-labeled datasets for each new task, as the AI is able to infer structure from the environment and textual prompts. This capability is a key part of the system of the present invention to support the process AI arbitrage automation architecture.

Large language models are able to ingest unstructured data and derive insights without rigid feature engineering, as well-defined process architectures and constraints ensure outputs remain focused and applicable to the problem at hand, even where the input data is broad or ambiguous. Furthermore, the ability to generate or augment datasets with synthetic samples speeds up iterative improvements and eliminates the need for manual labeling, which is critical to self-evolving refinement and, ultimately, to process automation that translates to arbitrage appropriate value propositions. Furthermore, new AI-driven features or products are able to be conceived and implemented quickly due to the large amount of knowledge baked into large foundation models, providing cost savings by replacing large-scale dataset creation with targeted domain directives, knowledge bases, prompts, constraints, and process definitions.

AI Capability Arbitrage, as used with regard to the present invention, refers to the strategic exploitation of value differentials created by the implementation of uniquely architected AI systems in previously non-AI environments. This form of arbitrage differs from traditional financial arbitrage in that it actively creates the value differential rather than simply exploiting existing market inefficiencies. By leveraging the ability of AI to drive stacked exponential growth through self-improving optimization cycles leveraging our unique tools and approaches, this enables value enhancement and expansion that transcends traditional compound growth models by orders of magnitude. The system of the present invention utilizes self-reinforcing cycles of improvement that operate across multiple financial and operational dimensions. This creates a compound effect where each area of AI enhancement not only generates immediate value, but also enhances the system's ability to create even more value in future implementations via these rapidly evolving AI capabilities.

Referring now to the drawings in general, the illustrations are for the purpose of describing one or more preferred embodiments of the invention and are not intended to limit the invention thereto.

Figure 2:
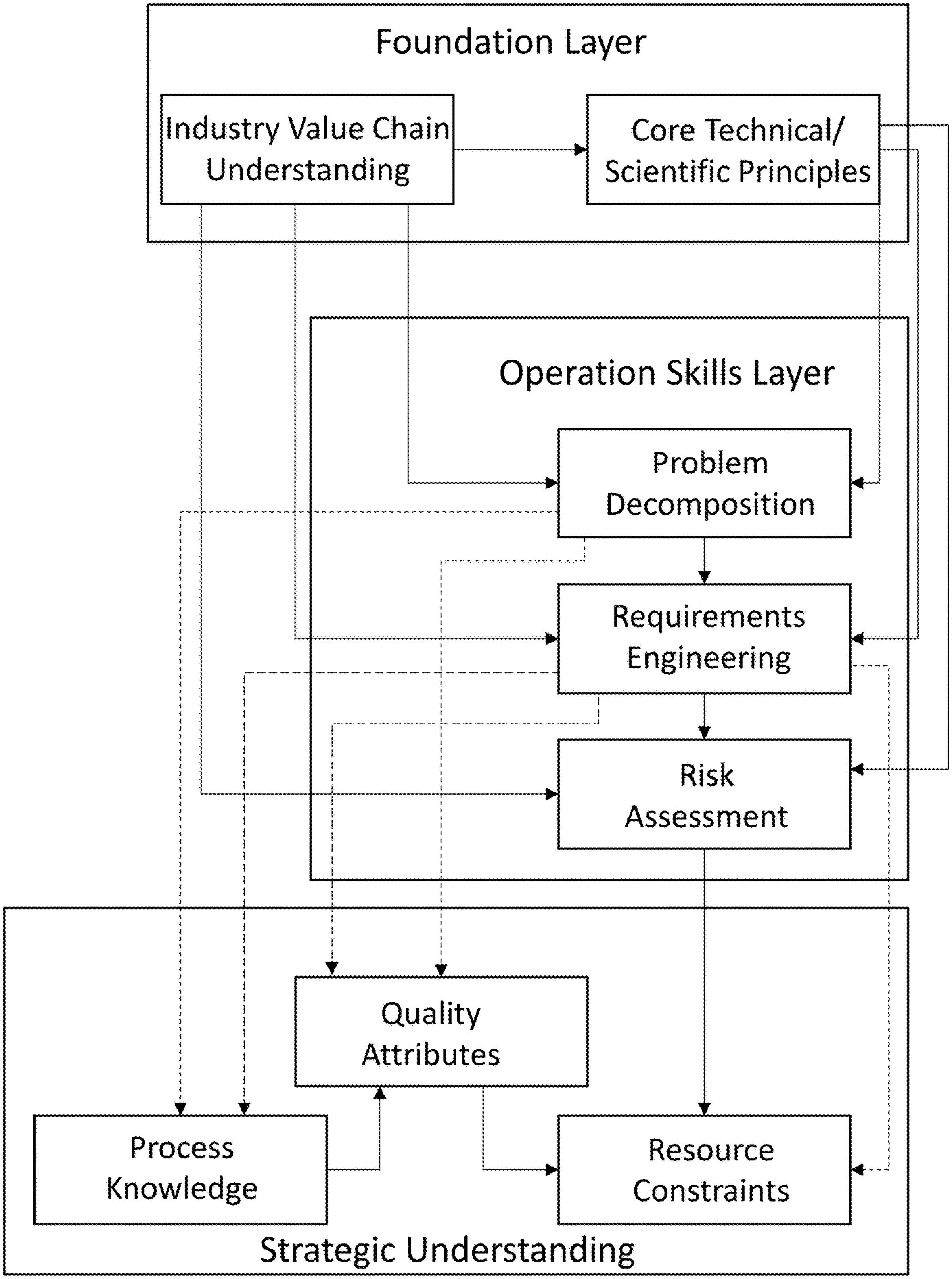
FIG. 2 is a schematic diagram of a multi-layer artificial intelligence (AI) system according to one embodiment of the present invention.

FIG. 2 is a schematic diagram of a multi-layer artificial intelligence (AI) system according to one embodiment of the present invention. As shown in FIG. 2, in one embodiment, the three primary components of the process optimization system of the present invention are the foundation layer, the operational skills layer, and the strategic understanding. In one embodiment, a data science methods component of the present invention includes traditional approaches (e.g., data collection, preparation, feature engineering, statistical analysis, etc.), leading methods (e.g., self-supervised learning, synthetic data generation, zero-shot learning, one-shot learning, few-shot learning, data centric AI, etc.) and a recursive self-optimizing data and directives input architecture unique to the present invention. An AI model architecture optimization component of the present invention includes traditional approaches (e.g., for architecture design, training methods, model evaluation, performance tuning, etc.), state-of-the-art methods (e.g., large language models, multi-modal models, neural architecture search, sparse modeling, etc.), and integration with the recursive data and directives input architecture unique to the present invention. In one embodiment, an inference time reasoning and optimization component includes traditional methods (e.g., model compression, hardware optimization, runtime performance, deployment strategies, etc.) and advanced optimization techniques (e.g., knowledge distillation, quantization-aware training, speculative inference, efficient fine-tuning, etc.) with a unique architecture that leverages this for self-improving process automation.

At least three main factors have prevented prior art systems from operating in the manner of the present invention. The first major issue has been reasoning limitations, as traditional automation systems operated on rigid, pre-programmed rules and were unable to handle novel situations or complex decision trees that require genuine reasoning. Furthermore, existing systems were unable to meaningfully connect field-specific and field-related knowledge domains or adapt to dynamically defined constraints and contexts. A second issue has been data quality and quantity constraints, due to the difficulty of acquiring sufficient high-quality training data, maintaining data freshness and relevance, dealing with privacy and compliance issues with real data, and handling edge cases and rare scenarios. Finally, earlier systems struggled with propagating errors through complex process chains, maintaining consistency across different business contexts, and providing reliable outputs for mission-critical decisions.

However, the systems implemented by the present invention resolve these issues, as they utilize sophisticated models able to perform multi-step logical reasoning, they better handle uncertainty and probabilistic outcomes, they integrate information across different domains and contexts, and they mitigate the need for nearly all the prior time-consuming, low-level process and procedural definition and integration work. Furthermore, the present invention leverages improved data processing, utilizing better synthetic data generation techniques that dramatically increase the basis and support for automated reasoning. The present invention also uses more efficient data augmentation methods, such as Light retrieval augmentation generation (RAG) and other embodiments that are able to scale order (n) or better, and do not disrupt prior training (unlike traditional fine-tuning methods). Furthermore, the data augmentation methods of the present invention are orders of magnitude less costly than the prior art methods. The system of the present invention also demonstrates an enhanced ability to learn from smaller datasets across limited examples, which is especially important during business operations and real-world situations.

The present invention achieves tetration growth through simultaneous optimization across multiple dimensions. In the technical dimension, the AI systems employed by the present invention continuously improve their own learning algorithms, with each optimization creating new opportunities for further optimization. Processing efficiency improvements enable more sophisticated analysis, supporting tetration-based AI growth rates. Novel solution spaces and approaches (e.g., continued emergent solutions) are automatically discovered by the present invention. The process supports distilled refinement of initial lower-quality inputs and queries to higher quality refinements that drive better results. This refines the input directives and more fully and deeply contextualizes the inputs and directives for field-specific usage and market-specific accessibility by humans of a wide range of skill and experience.

In the operational dimension, the process improvements of the present invention compound across different operational areas, with each efficiency gain enabling new optimization opportunities. Cross-functional synergies therefore emerge automatically and operational insights transfer across different implementations of the present invention. In the financial dimension, the cost reductions of the present invention provide funding for additional improvement initiatives and revenue gains create resources for further optimization as well. Cost reductions able to be suggested by the AI module of the present invention include, but are not limited to, hirings and/or layoffs, one or more new automation methods, changes in suppliers, and/or changes to manufacturing methods. Additionally, valuation increases enable cheaper capital access and these financial improvements compound across multiple metrics.

The present invention includes sophisticated value capture mechanisms, including equity-based arrangement and performance-based revenue sharing. In one embodiment, the equity-based arrangements include pre-implementation equity stakes with anti-dilution provisions, milestone-based equity vesting tied to performance metrics, and rights of first refusal on future equity issuance. In one embodiment, the performance-based revenue sharing includes a baseline percentage of documented cost savings, an escalating share of incremental revenue gains, participation rights in future value creation events, and ongoing licensing fees for core AI technologies.

In one embodiment, the present invention is directed to a method for achieving tetration growth in business process optimization, including implementing self-improving AI optimization cycles across multiple dimensions, utilizing leading-edge data science methods for continuous improvement, applying state-of-the-art AI model research and development, employing advanced inference optimization techniques, and creating self-reinforcing cycles of improvement across technical, operational, and financial dimensions. In one embodiment, the self-improving AI optimization cycles include automated identification of process inefficiencies, real-time adaptation of optimization strategies, continuous monitoring and adjustment of business processes, and/or dynamic resource allocation based on performance metrics. In one embodiment, the data science methods include automated data collection from business processes, real-time analysis of operational metrics, predictive modeling of process outcomes, and/or automated feature engineering and selection. In one embodiment, arbitrage support provided by the present invention includes identification of value differentials between current and optimized states, quantification of improvement opportunities, real-time valuation impact assessment, and/or automated return on investment (ROI) calculation and optimization. In one embodiment, the self-improving AI optimization cycles include continuous improvement of learning algorithms, automatic discovery of new optimization opportunities, cross-functional synergy generation, and/or meta-learning capabilities. In one embodiment, the leading-edge data science methods include self-supervised learning systems, synthetic data generation capabilities, zero-shot or few-shot learning implementations, and/or data-centric AI optimization techniques.

Examples of business process implementations of the present invention include 30-50% efficiency gains for manufacturing process optimization, 20-40% cost reduction for supply chain optimization, 25-45% cost reduction for energy consumption optimization, and/or 60-80% response time improvement for customer service automation.

In one embodiment, the present invention includes a system for AI capability arbitrage including means for implementing uniquely architected AI systems, means for creating value differentials in non-AI environments, means for capturing value through equity and performance-based mechanisms, and means for achieving cross-domain acceleration effects. The AI system architecture used for this system is able to include a modular design enabling rapid deployment, a scalable implementation framework, adaptive learning capabilities, and/or cross-industry compatibility. In one embodiment, the value differential creation component of this system includes baseline performance assessment, optimization opportunity identification, value gap quantification, and/or implementation roadmap generation. In one embodiment, the value capture mechanisms of the system include equity stake valuation models, performance-based fee calculations, milestone achievement tracking and/or value creation event monitoring. In one embodiment, the means for implementing the system of the present invention include traditional data science methods, leading-edge AI techniques, advanced optimization approaches, and/or self-reinforcing improvement cycles. In one embodiment, the system further includes means for automatic discovery of new revenue streams, self-evolving optimization strategies, creation of a novel value capture mechanism, and/or identification of unexpected market opportunities. As a theoretical example of the benefits of such a system, assuming a pre-AI manufacturing company valuation is $300M and the system identifies cost reductions of $40M and new revenue streams worth $30M, then the post-AI implementation via AI-enabled efficiency and growth gains increases to about $2.7B.

In one embodiment, the present invention implements self-improving cycles that enable business transformation through a learning algorithm enhancement via automated hyperparameter optimization, model architecture adaptation, training strategy optimization, and/or performance metric evolution. The self-improving cycles further enable business transformation through optimization discovery, which includes process inefficiency identification, resource utilization analysis, workflow optimization, and/or cost reduction potential assessment. In one embodiment, the business impact of the invention includes automated workflow optimization, resource allocation improvement, process efficiency enhancement, and/or cost structure optimization. In one embodiment, the present invention improves computing efficiency by 40% for data center optimization. In one embodiment, the present invention reduces waste by 35% for manufacturing process optimization. In one embodiment, the present invention improves delivery times by 45% for supply chain optimization. In one embodiment, the present invention provides an energy consumption reduction of 25% through automated optimization.

In one embodiment, the present invention is directed to a method for multi-dimensional force multiplication in AI-enabled business processes, including technical dimension optimization, operational dimension enhancement, financial dimension improvement, and/or cross-domain acceleration effects.

In one embodiment, the present invention is directed to a system for meta-learning capability enhancement, including means for AI systems to learn how to learn better, means for optimizing optimization processes, means for creating novel optimization strategies, and/or means for implementing self-improving efficiency discovery.

In one embodiment, the present invention is directed to a method for implementing network effect multiplication in AI systems, including converting each node into a force multiplier, enabling networks to learn from networking learning, generating meta-network effects, facilitating cross-pollination of improvements, and creating an emergence of unexpected synergies.

In one embodiment, the present invention is directed to a method of competitive advantage amplification through AI implementation, including strengthening future capabilities exponentially, creating insurmountable lead times, implementing self-reinforcing market dominance, and enabling automatic moat widening.

Figure 3:
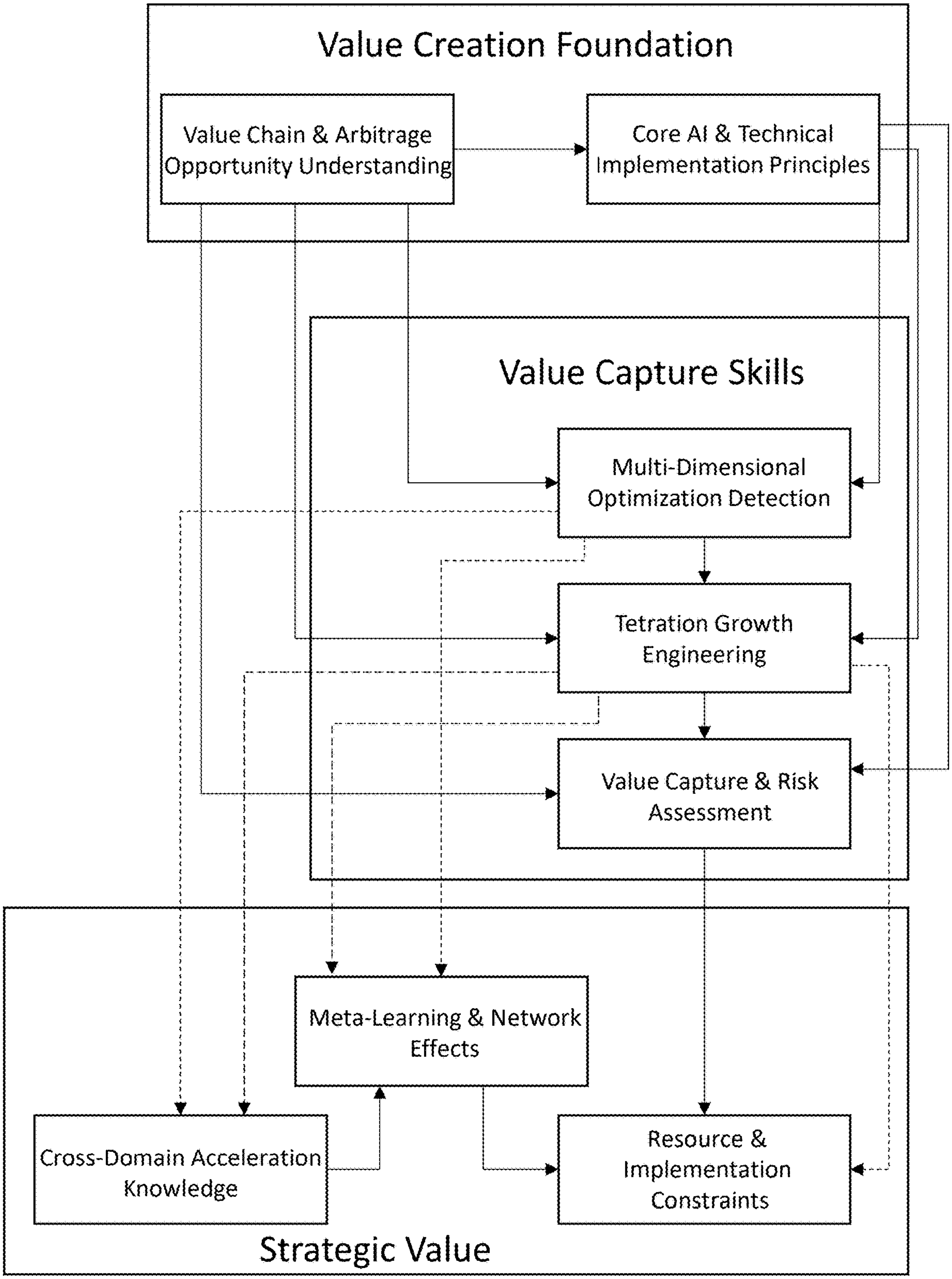
FIG. 3 is a schematic diagram of an implementation architecture for supporting arbitraged value outcomes according to one embodiment of the present invention.

FIG. 3 is a schematic diagram of an implementation architecture for supporting arbitraged value outcomes according to one embodiment of the present invention. In one embodiment, the architecture for implementing the present invention includes a plurality of hierarchical layers. In one embodiment, the plurality of hierarchical layers includes a base layer, configured for data ingestion and preprocessing, feature extraction and engineering, quality assurance and validation, and/or automated data cleaning. In one embodiment, the plurality of hierarchical layers includes a learning layer, including one or more meta-learning frameworks, transfer learning systems, multi-modal training pipelines, and/or adaptive optimization algorithms. In one embodiment, the plurality of hierarchical layers includes an optimization layer, which includes one or more efficiency optimization engines, and provides for real-time performance monitoring, dynamic resource allocation, and/or automated parameter tuning. In one embodiment, the plurality of hierarchical layers includes a value capture layer, including one or more ROI optimization mechanisms and automated reporting systems, which are operable for performance metrics tracking and/or value differential calculation.

One implementation of the system is cross-domain acceleration. Primary acceleration paths to enable cross-domain acceleration include energy efficiency optimization loops, computing power enhancement cycles, AI capability expansion mechanisms, and/or resource optimization feedback systems. Secondary effect generation also contributes to cross-domain acceleration, which includes knowledge transfer protocols across verticals, best practice evolution algorithms, capability stack expansion mechanisms, and resource optimization feedback loops.

Meta-learning implementations of the present invention include learning optimization and knowledge management. In one embodiment, the learning optimization includes self-improving learning rate adjustments, dynamic architecture modification, automated hyperparameter optimization, and/or novel training strategy generation. In one embodiment, the knowledge management includes cross-implementation learning transfer, automated knowledge base expansion, pattern recognition enhancement, and/or innovation capability amplification.

Value capture implementations of the present invention include performance tracking and value distribution. In one embodiment, performance tracking includes real-time efficiency monitoring, cost reduction calculation, revenue enhancement measurement, and/or valuation impact assessment. In one embodiment, value distribution includes automated performance fee calculation, providing equity stake valuation updates, milestone achievement tracking, and/or value creation event monitoring.

The present invention provides several key benefits over prior art systems, including unprecedented growth rates, sustainable competitive advantage, value creation multiplication, and risk reduction. The achievement of unprecedented growth rates includes the achievement of tetration growth patterns through self-reinforcing optimization cycles, continuous capability enhancement, and automatic efficiency improvements. Sustainable competitive advantage includes a self-improving market position, increasing returns to scale, automatic moat widening, and perpetual innovation capability. Value creation multiplication includes multi-dimensional optimization, compound effect generation, novel opportunity discovery, and automatic value capture. Risk reduction includes automated risk identification, self-improving mitigation strategies, dynamic adaptation capabilities, and continuous monitoring and adjustment.

FIG. 4 is a schematic diagram of a high level system architecture according to one embodiment of the present invention. As shown in FIG. 4, in one embodiment, the architecture includes a data science layer, a model layer, and an optimization layer. The data science layer is operable to perform tasks including data collection, data preparation, feature engineering, and/or statistical analysis. The model layer is able to perform tasks including architecture design, training pipeline, model evaluation, and/or performance tuning. The optimization is able to perform tasks including model compression, hardware optimization, runtime performance monitoring and optimization, and/or development strategy development. In one embodiment, the architecture is hierarchical such that information proceeds form the data science layer to the model layer to the optimization layer.

Figure 5:
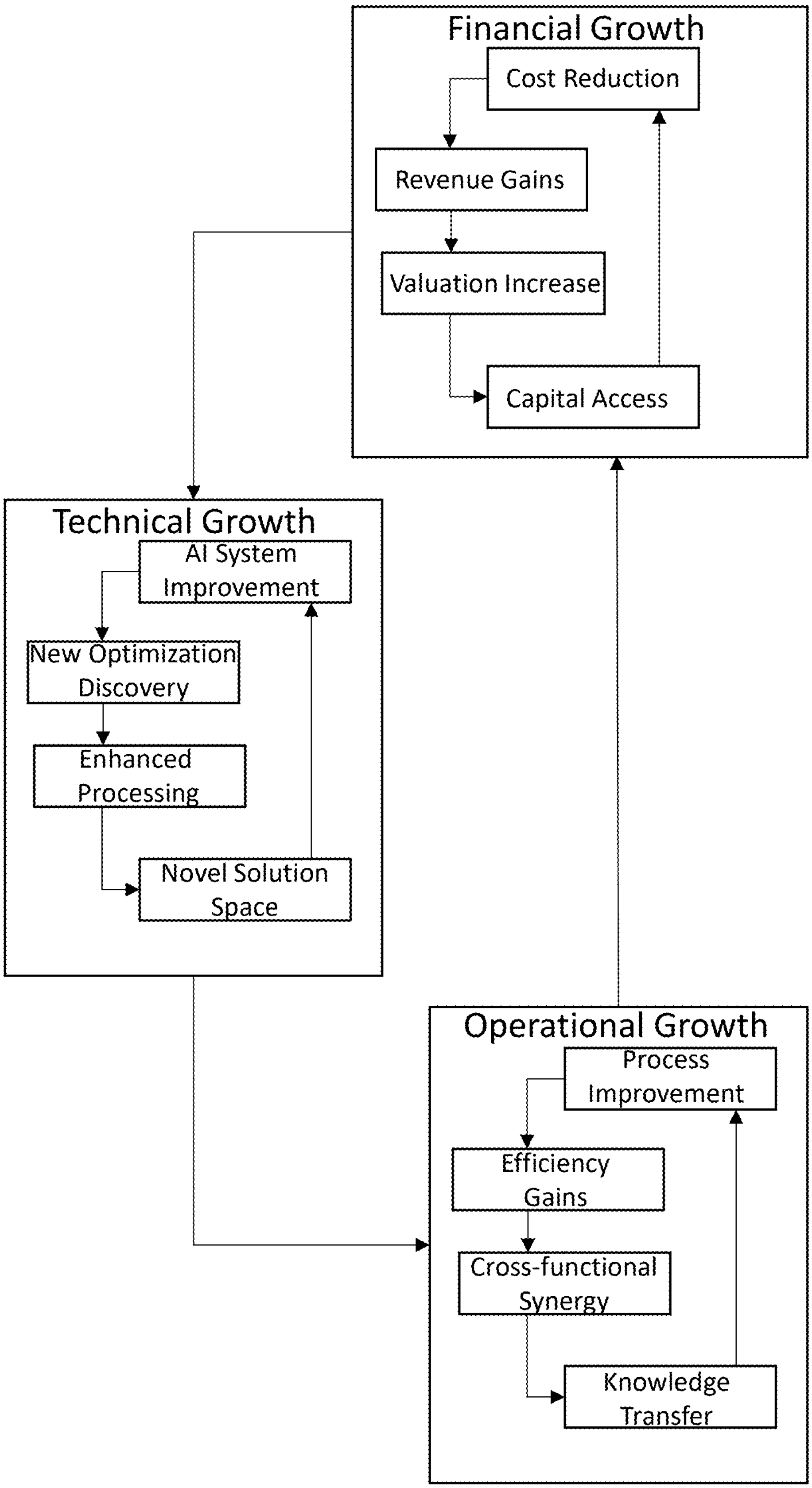
FIG. 5 is a schematic diagram of a tetration growth implementation according to one embodiment of the present invention.

FIG. 5 is a schematic diagram of a tetration growth implementation according to one embodiment of the present invention. As shown in FIG. 5, the system of the present invention provides for growth across three dimensions: financial, technical, and operational, each of which include self-reinforcing cycles for continuous improvement. For the financial dimension, the present system provides for cost reduction, revenue gains, valuation increases, and capital access. For the technical dimension, the present system provides for AI system improvement, new optimization discovery, enhanced processing, and development of a novel solution space. For the operational dimension, the present system provides for process improvement, efficiency gains, cross-functional synergy, and knowledge transfer.

Figure 6:
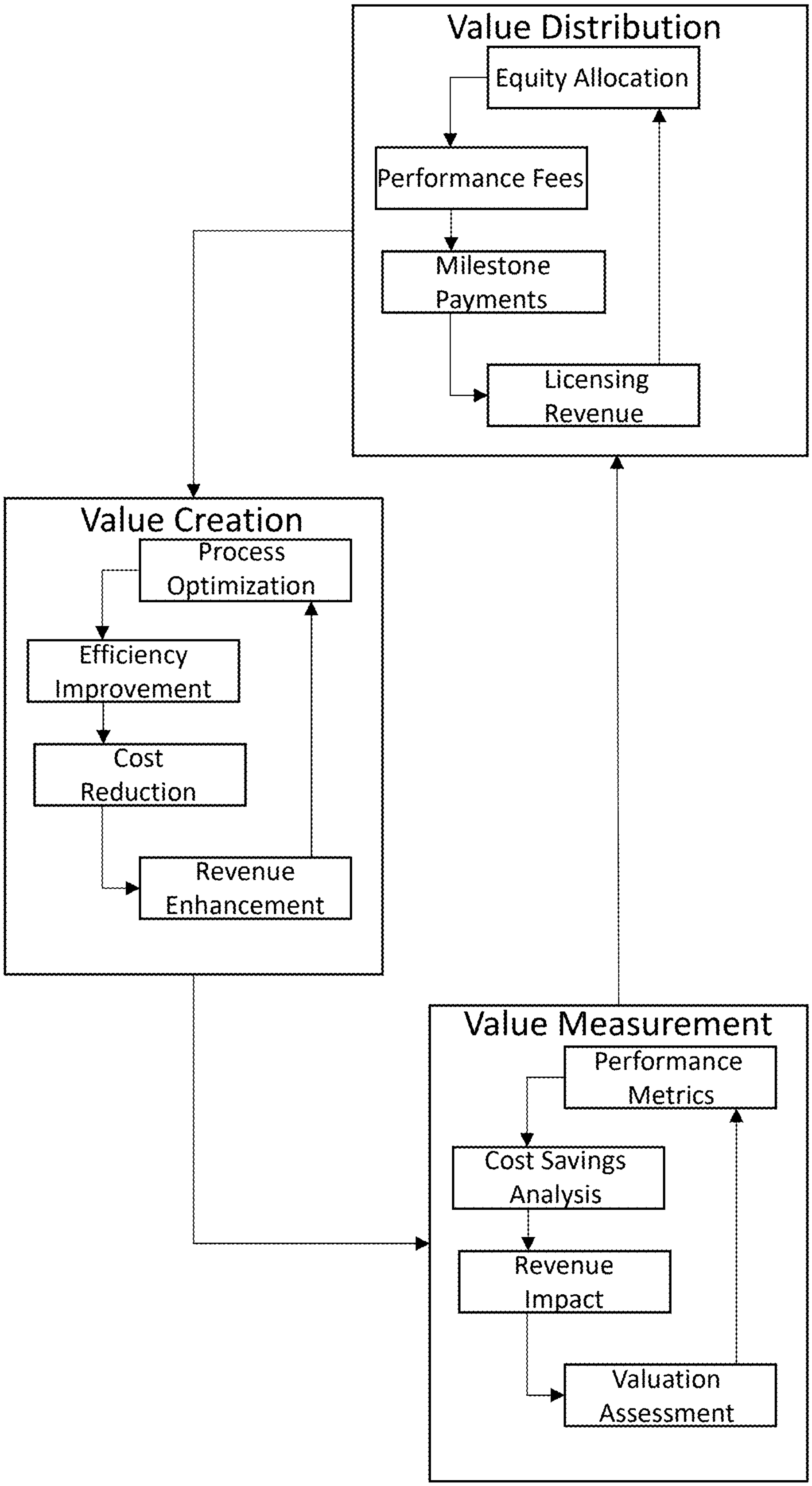
FIG. 6 is a schematic diagram of a value capture architecture according to one embodiment of the present invention.

FIG. 6 is a schematic diagram of a value capture architecture according to one embodiment of the present invention. Furthermore, the system of the present invention provides for growth in the areas of value creation, value measurement, and value distribution, each of which includes a feedback loop for continuous improvement. With regard to value distribution, the present invention provides for equity allocation, earning of performance fees, earning of milestone payments, and increased licensing revenue. With regard to value creation, the present invention provides for process optimization, efficiency improvement, cost reduction, and revenue enhancement. With regard to value measurement, the present invention provides for performance metric evaluation, cost savings analysis, revenue impact analysis, and valuation assessment.

Figure 7:
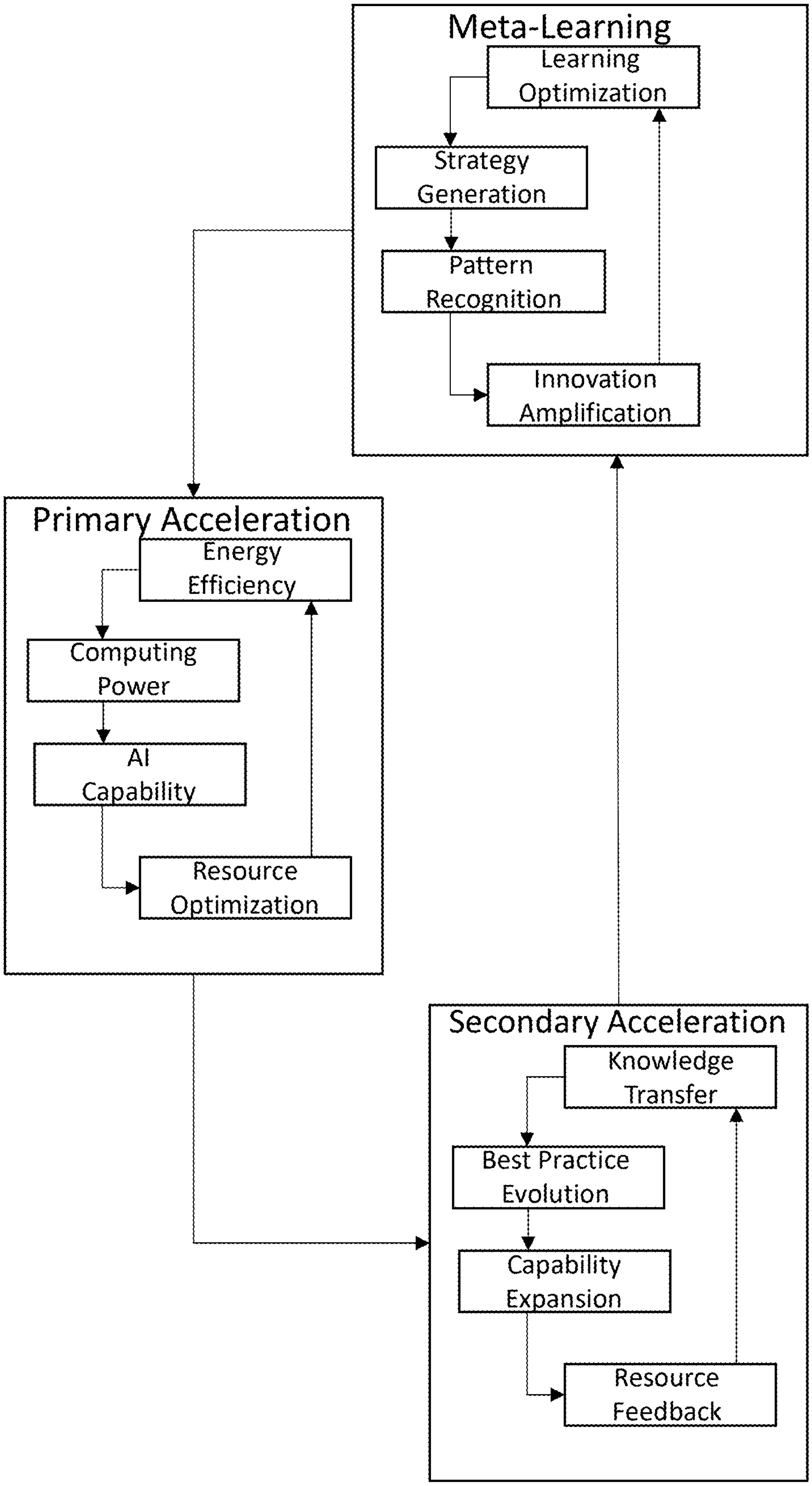
FIG. 7 is a schematic diagram of a cross-domain acceleration system according to one embodiment of the present invention.

FIG. 7 is a schematic diagram of a cross-domain acceleration system according to one embodiment of the present invention. The system of the present invention includes both primary and secondary acceleration paths with meta-learning integration. The meta-learning capabilities of the present invention include learning optimization, strategy generation, pattern recognition, and innovation amplification. The primary acceleration path includes energy efficiency optimization, computing power optimization, AI capability improvement, and resource optimization. The secondary acceleration path includes knowledge transfer, best practice evolution, capability expansion, and resource feedback.

Figure 8:
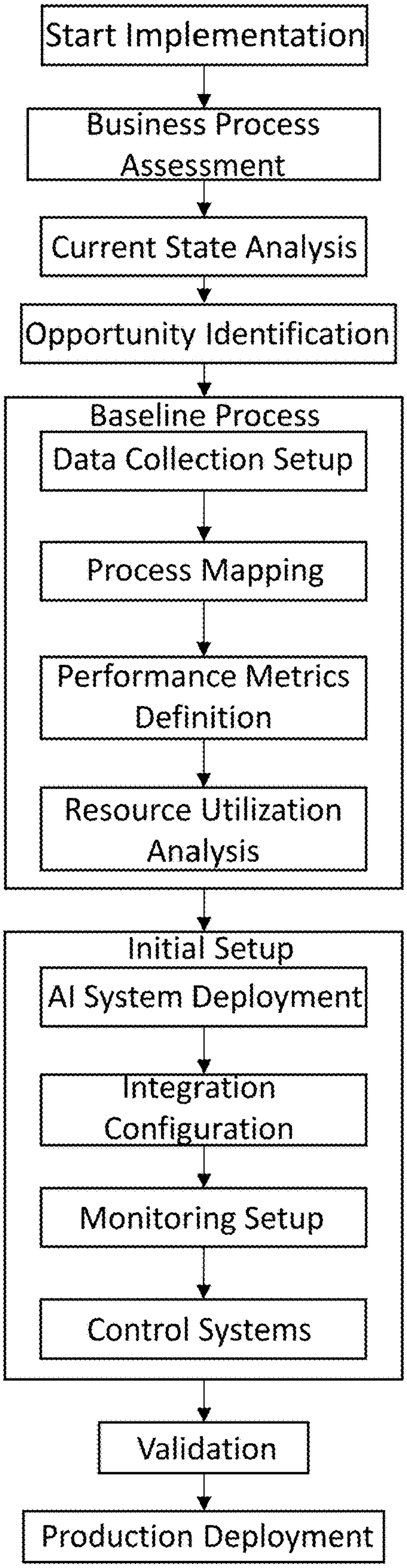
FIG. 8 is a schematic diagram of an initial implementation process according to one embodiment of the present invention.

FIG. 8 is a schematic diagram of an initial implementation process according to one embodiment of the present invention. After the start of the implementation, the system carries out business process assessment, followed by current state analysis, and then opportunity identification. After opportunity identification, the implementation process proceeds with the baseline subprocess, including data collection setup, process mapping, performance metrics definition, and resource utilization analysis. After the baseline subprocess, the initial setup commences, and includes AI system development, integration configuration, monitoring setup, and system control. Finally, the implementation process includes a validation step followed by production development.

Figure 9:
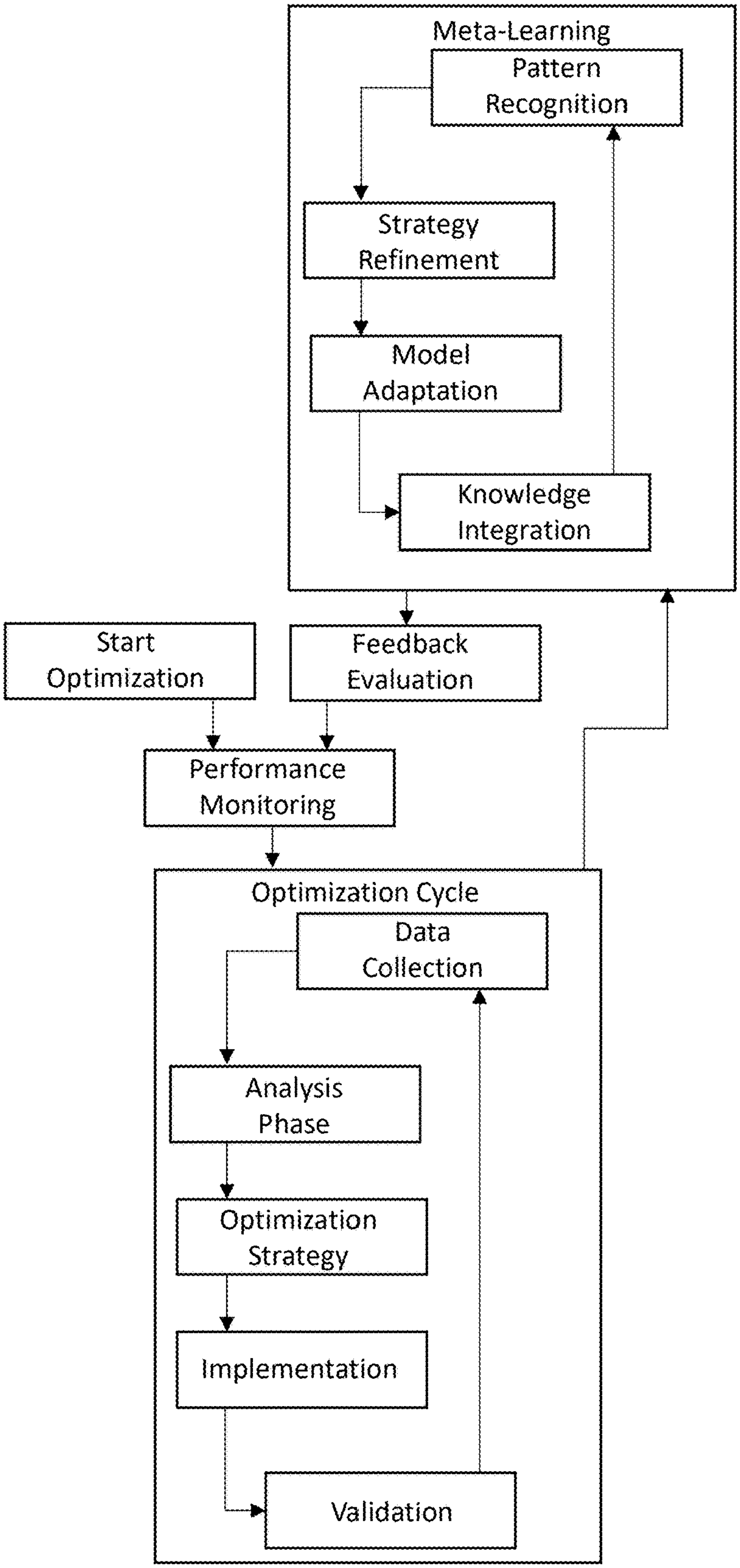
FIG. 9 is a schematic diagram of an optimization cycle implementation according to one embodiment of the present invention.

FIG. 9 is a schematic diagram of an optimization cycle implementation according to one embodiment of the present invention. In one embodiment, the optimization cycle implementation includes meta-learning integration, with a feedback loop. The meta-learning includes pattern recognition, strategy refinement, model adaptation, and knowledge integration. The meta-learning is used to update feedback evaluation, which proceeds to performance monitoring. After performance monitoring, the system proceeds to an optimization cycle, including data collection, analysis, strategic optimization, implementation, and validation. After the optimization cycle, the system is able to continue the meta-learning process.

Figure 10:
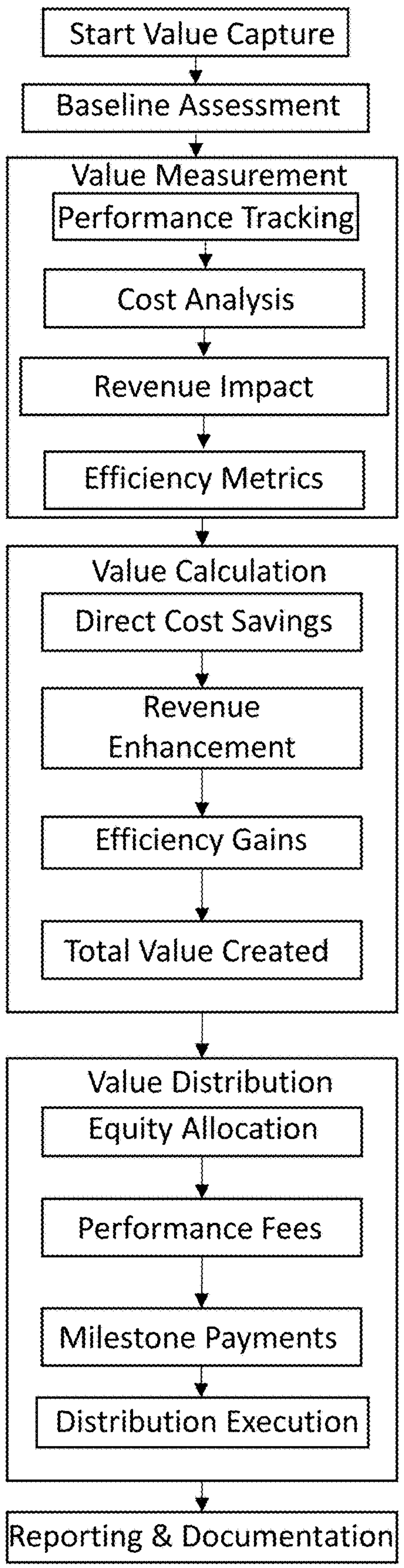
FIG. 10 is a schematic diagram of a value capture implementation process according to one embodiment of the present invention.

FIG. 10 is a schematic diagram of a value capture implementation process according to one embodiment of the present invention. The value capture process commences and proceeds to baseline assessment. After baseline assessment, the value capture process includes value measurement, which includes performance tracking, cost analysis, revenue impact analysis, and efficiency metric evaluation. After value measurement, the value capture process proceeds to value calculation, which includes direct cost savings analysis, revenue enhancement, efficiency gains analysis, and total value creation. After value calculation, the value capture process proceeds to value distribution, which includes equity allocation, performance fee assessment, milestone payments, and distribution execution. Finally, the system proceeds to reporting and documentation.

Figure 11:
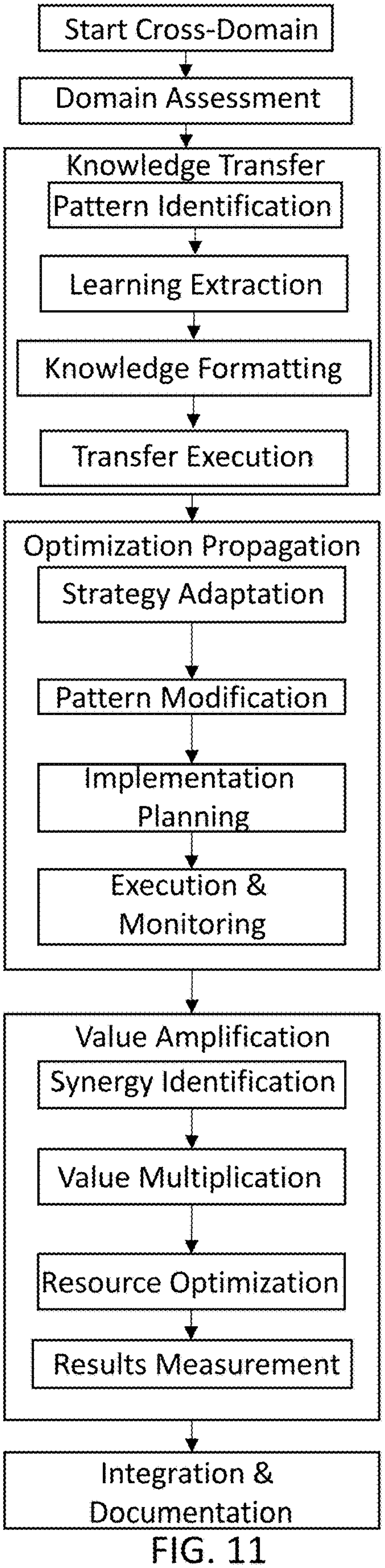
FIG. 11 is a schematic diagram of a cross-domain implementation process according to one embodiment of the present invention.

FIG. 11 is a schematic diagram of a cross-domain implementation process according to one embodiment of the present invention. The cross-domain implementation begins with a domain assessment before proceeding to knowledge transfer, which includes pattern identification, learning extraction, knowledge formatting, and transfer execution. After knowledge transfer, the system proceeds to optimization propagation, which includes strategy adaptation, pattern modification, implementation planning, and execution and monitoring. After knowledge transfer, the system proceeds to value amplification, which includes synergy identification, value multiplication, resource optimization, and results measurement. Finally, the process culminates in integration and documentation.

In one example of the implementation of the present invention, initial AI implementation for a mid-sized manufacturing company, with $100M in annual revenue and a $300M pre-AI valuation, results in reduction of manufacturing costs by $15M through energy optimization, $25M in gains as a result of productivity improvements, $30M in new revenue streams from AI-enabled product customization, and an increase of the value of the company to $2.7B.

In another example of implementation in the energy sector, implementation at a $500M revenue energy company with an initial 15% equity stake valued at $75M results in a post-implementation value of $3.5B, an equity stake value of $525M, and annual performance fees of $45M, for a total value capture of $495M in the first year.

In yet another example of implementation for data center operations, implementation leads to a 25% energy cost reduction through AI optimization, improved cooling efficiency allowing for 40% more computing power (enabling more sophisticated AI models and novel optimization strategy discovery), and second-order optimization of an additional 35% energy reduction, with the process continuing to build on previous improvements with each cycle.

In one embodiment, the AI module of the present invention is configured to receive unstructured data inputs. Unstructured data inputs are defined as those not following a pre-defined data model (e.g., a spreadsheet) with labeled aspects of the data. In the context of generative AI, queries are also considered to be structured data inputs. Instead, unstructured data is able to exist in a raw or native form in a file system or data lake, including such examples as emails, presentations, video data, audio data, social media posts, text reports, data obtained from at least one application programming interface (API), diagrams, images, and/or other non-structured formats. In one embodiment, the unstructured data inputs include a mind map and/or other data or documentation regarding a business to an AI model (e.g., OPENAI 03, etc.). In one embodiment, the mind map includes various goals, steps in a process, business details, personnel details, and/or other business-related concepts. In one embodiment, other data involving a business includes revenue, profit, costs, costs for specific line items, revenue from particular products, marginal profit, and/or other figures regarding a business. The AI model automatically extracts core data from the unstructured data and analyzes this data to produce an output. The AI model then provides business plans, changes to business structure, suggested hires and/or layoffs, and/or business related diagrams, suggestions, advice, or documents.

Figure 12:
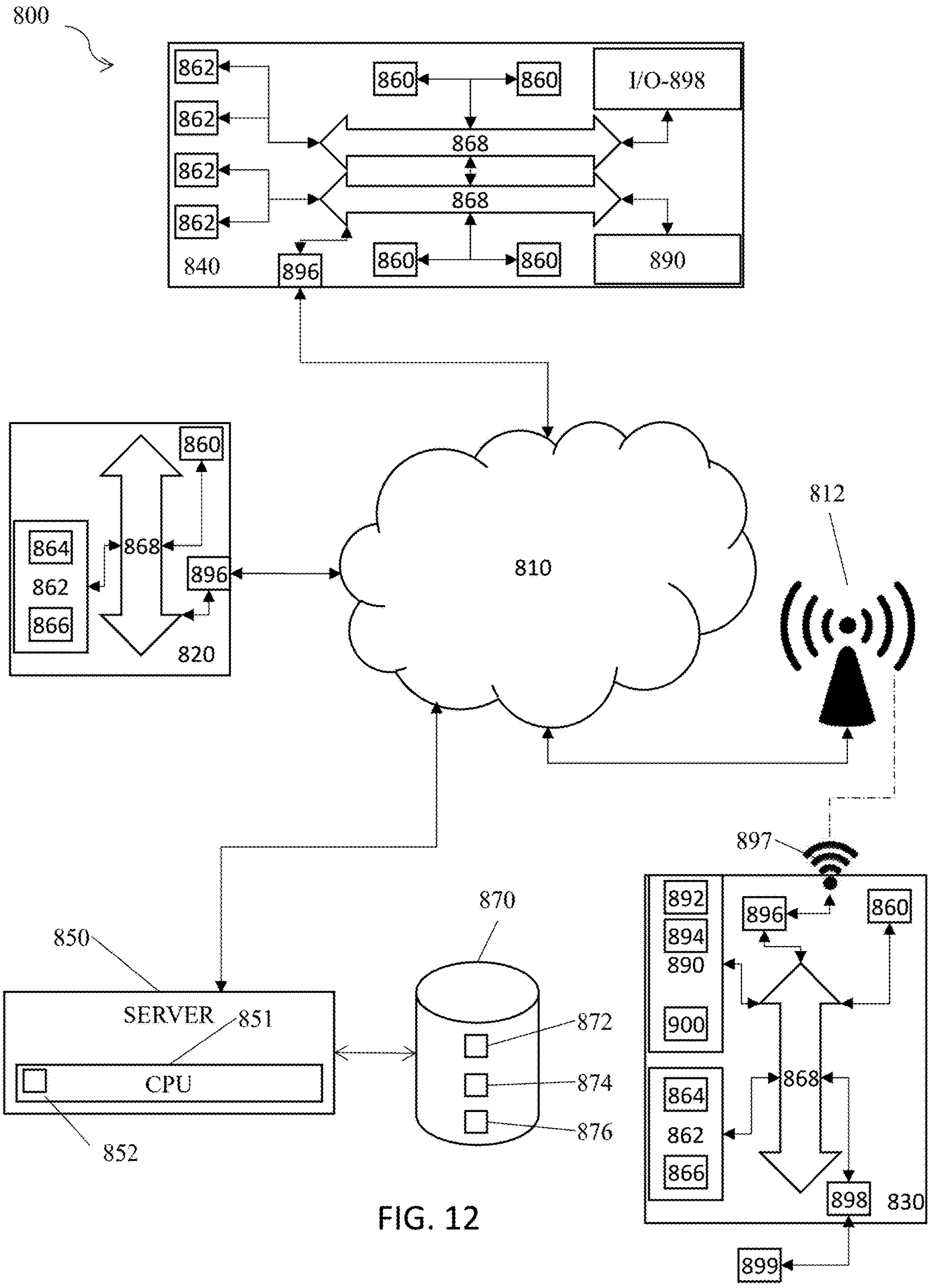
FIG. 12 is a schematic diagram of a system of the present invention.

FIG. 12 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 12, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 12, is operable to include other components that are not explicitly shown in FIG. 12, or is operable to utilize an architecture completely different than that shown in FIG. 12. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention. Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for achieving tetration growth in process optimization using artificial intelligence (AI), comprising:

an AI module receiving data inputs, a directive, and at least one boundary for generating at least one output;

wherein the AI module includes an architecture for analyzing the data inputs and the directive and providing the at least one output;

wherein the architecture includes a first computational layer, a second computational layer, and a third computational layer;

the first computational layer generating synthetic data;

the second computational layer utilizing the synthetic data and the data inputs to create custom data;

the second computational layer self-analyzing the custom data;

the second computational layer automatically adjusting a learning rate for the AI module such that the AI module iteratively modifies the architecture exponentially over time to increase reasoning ability of the AI module;

the second computational layer further modifying the architecture for analyzing the data inputs and the directive and generating the at least one output based on Reinforcement Learning from AI Feedback (RLAIF), wherein the RLAIF includes self-reinforcing cycles of improvement across at least one technical dimension, at least one operational dimension, and at least one financial dimension; and the AI module providing the at least one output, wherein the at least one output provides at least one recommended action to improve the at least one financial dimension including a recommended action to reduce at least one cost for the process and at least one recommended action to improve the at least one operational dimension including a recommended action to include additional data from an additional data source in the data inputs;

wherein the recommended action to reduce the at least one cost for the process includes one or more new automation methods, changes in suppliers, and/or changes to manufacturing methods;

wherein the recommended action to include the additional data includes revenue gains;

wherein the AI module is hosted by at least one server computer including a processor and a memory;

wherein the architecture includes parameters for utilization of the at least one output by the AI module as a subsequent input to generate a subsequent output; and wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output.

2. The method of claim 1, wherein the unstructured data inputs include one or more mind maps, one or more digital images, and/or supporting descriptions for mind maps and/or digital images.

3. The method of claim 2, wherein the one or more mind maps include goals, steps in a process, business details, business sales and cost data, and/or personnel details.

4. The method of claim 1, wherein the at least one output includes suggestions of one or more new product offerings, one or more markets to enter, one or more potential licensees, and/or one or more updated business models.

5. The method of claim 1, wherein the self-reinforcing cycles of improvement include one-shot or few-shot learning techniques, and wherein the one-shot or few-shot learning techniques are implemented during pre-training or during inference time as part of the RLAIF.

6. The method of claim 1, wherein the directive includes at least one business goal.

7. The method of claim 1, wherein the at least one boundary includes a maximum budget, a maximum time frame, a maximum overhead cost, a maximum number of team members, and/or cost-constraint functions that resolve to scalar values.

8. A system for achieving tetration growth in process optimization using artificial intelligence (AI), comprising:

an AI module configured to receive data inputs, a directive, and at least one boundary for generating at least one output; and at least one server computer, including a processor and a memory, configured to host the AI module;

wherein the AI module includes an architecture for analyzing the data inputs and the directive and providing the at least one output;

wherein the architecture includes a first computational layer, a second computational layer, and a third computational layer;

wherein the first computational layer generates synthetic data;

wherein the second computational layer utilizes the synthetic data and the data inputs to create custom data;

wherein the second computational layer self-analyzes the custom data;

wherein the second computational layer automatically adjusts a learning rate for the AI module such that the AI module iteratively modifies the architecture exponentially over time to increase reasoning ability of the AI module;

wherein the architecture is further modified to analyze the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension;

wherein the AI module provides the at least one output, wherein the at least one output provides at least one recommended action to improve the at least one technical dimension including a recommended action to improve the output of the AI module and at least one recommended action to improve the at least one operational dimension including a recommended action to improve an efficiency of the process;

wherein the at least one output provides a recommended action to reduce at least one cost for the process including changes in suppliers;

wherein the at least one output provides a recommended action to include additional data includes revenue gains;

wherein the architecture includes parameters for utilization of the at least one output by the AI module for a subsequent output; and wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output.

9. The system of claim 8, wherein the unstructured data inputs include one or more mind maps in one or more standard formats.

10. The system of claim 9, wherein the one or more mind maps include goals, steps in a process, business details, personnel details, and/or other business-related concepts.

11. The system of claim 8, wherein the at least one output includes identification of one or more new revenue streams and/or one or more proposed value creation mechanisms.

12. The system of claim 8, wherein the self-reinforcing cycles of improvement include one-shot or few-shot learning techniques, and wherein the one-shot or few-shot learning techniques are implemented during pre-training or during inference time as part of the RLAIF.

13. The system of claim 8, wherein the directive includes at least one business goal.

14. The system of claim 8, wherein the at least one boundary includes a maximum budget, a maximum time frame, a maximum overhead cost, a maximum number of team members, and/or cost-constraint functions that resolve to scalar values.

15. A method for achieving tetration growth in process optimization using artificial intelligence (AI), comprising:

an AI module receiving data inputs, a directive, and at least one boundary for generating at least one output;

wherein the AI module includes an architecture for analyzing the data inputs and the directive and providing the at least one output;

wherein the architecture includes a first computational layer, a second computational layer, and a third computational layer;

the first computational layer generating synthetic data;

the second computational layer utilizing the synthetic data and the data inputs to create custom data;

the second computational layer self-analyzing the custom data;

the second computational layer automatically adjusting a learning rate for the AI module such that the AI module iteratively modifies the architecture exponentially over time to increase reasoning ability of the AI module;

the second computational layer further modifying the architecture for analyzing the data inputs and the directive and generating the at least one output based on Reinforcement Learning from AI Feedback (RLAIF), wherein the RLAIF provides for self-reinforcing cycles of improvement across at least one technical dimension, at least one operational dimension, and at least one financial dimension; and the AI module providing the at least one output, wherein the at least one output provides at least one recommended action to improve the at least one financial dimension including a recommended action to reduce at least one cost for the process and a recommended action to integrate the process with at least one second process;

wherein the recommended action to reduce the at least one cost for the process includes changes to manufacturing methods;

wherein the at least one output provides a recommended action to include additional data including improvement initiatives;

wherein the AI module is hosted by at least one server computer including a processor and a memory;

wherein the data inputs include unstructured data inputs, data obtained from at least one application programming interface (API), and at least one image file, wherein the AI module is operable to identify core data from the unstructured data inputs, the data obtained from at least one application programming interface (API), and the at least one image file and create associations among the core data to create the at least one output; and wherein the unstructured data inputs include one or more mind maps.

16. The method of claim 15, wherein the one or more mind maps include goals, steps in a process, business details, personnel details, and/or other business-related concepts.

17. The method of claim 15, wherein the at least one boundary includes a maximum budget, a maximum time frame, a maximum overhead cost, a maximum number of team members, and/or cost-constraint functions that resolve to scalar values.

* * * * *